United States Patent
Kume et al.

(10) Patent No.: US 10,371,257 B2
(45) Date of Patent: Aug. 6, 2019

(54) ROTATIONAL DRIVE APPARATUS AND SHIFT-BY-WIRE SYSTEM HAVING THE SAME

(71) Applicant: DENSO CORPORATION, Kariya, Aichi-pref. (JP)

(72) Inventors: Mikine Kume, Kariya (JP); Toru Tabuchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 15/363,226

(22) Filed: Nov. 29, 2016

(65) Prior Publication Data

US 2017/0152943 A1 Jun. 1, 2017

(30) Foreign Application Priority Data

Nov. 30, 2015 (JP) ................................. 2015-234202
Oct. 25, 2016 (JP) ................................. 2016-208640

(51) Int. Cl.
  *F16H 57/02*  (2012.01)
  *F16H 61/32*  (2006.01)
  *H02K 7/116*  (2006.01)
  *H02K 11/215* (2016.01)
  *H02K 11/33*  (2016.01)

(52) U.S. Cl.
  CPC ............. *F16H 61/32* (2013.01); *F16H 57/02* (2013.01); *H02K 7/116* (2013.01); *H02K 11/215* (2016.01); *H02K 11/33* (2016.01); *F16H 2057/02034* (2013.01); *F16H 2061/326* (2013.01)

(58) Field of Classification Search
  CPC ..... F16H 2061/326; F16H 2057/02034; F16H 61/32
  See application file for complete search history.

(56) References Cited

U.S. PATENT DOCUMENTS

| | | | |
|---|---|---|---|
| 6,743,137 B2 * | 6/2004 | Rilbe | F16H 1/321 475/163 |
| 2010/0175487 A1 | 7/2010 | Sato | |
| 2012/0100949 A1* | 4/2012 | Nagumo | F16H 1/32 475/149 |

(Continued)

FOREIGN PATENT DOCUMENTS

| JP | 2002-272057 | 9/2002 |
| JP | 2010-203543 | 9/2010 |
| JP | 5648564 | 1/2015 |

*Primary Examiner* — William Kelleher
*Assistant Examiner* — Gregory T Prather
(74) *Attorney, Agent, or Firm* — Nixon & Vanderhye PC (57) ABSTRACT

An output portion is formed integrally with an output gear made of a magnetic material and is rotated integrally with the output gear. A yoke is placed at the output gear and includes first and second yokes. An arcuate gap, which extends along an arc that is centered at a rotational center of the output gear, is formed between the first yoke and the second yoke. A magnet is installed between one end of the first yoke and one end of the second yoke. Another magnet is installed between another end of the first yoke and another end of the second yoke. A Hall IC is placed in the arcuate gap and is movable relative to the yoke. Primary holes are formed between the rotational center and the yoke such that the primary holes extend through the output gear in a plate thickness direction of the output gear.

12 Claims, 6 Drawing Sheets

(56) References Cited

U.S. PATENT DOCUMENTS

| | | | |
|---|---|---|---|
| 2014/0187373 A1* | 7/2014 | Yamanaka | H02K 7/116 |
| | | | 475/149 |
| 2015/0184584 A1* | 7/2015 | Kuroda | F02B 37/186 |
| | | | 475/149 |
| 2016/0131252 A1* | 5/2016 | Kurita | F16H 61/32 |
| | | | 74/473.12 |
| 2017/0130831 A1* | 5/2017 | Uryu | F16H 61/32 |

* cited by examiner

ROTATIONAL DRIVE APPARATUS AND SHIFT-BY-WIRE SYSTEM HAVING THE SAME

CROSS REFERENCE TO RELATED APPLICATION

This application is based on and incorporates herein by reference Japanese Patent Application No. 2015-234202 filed on Nov. 30, 2015 and Japanese Patent Application No. 2016-208640 filed on Oct. 25, 2016.

TECHNICAL FIELD

The present disclosure relates to a rotational drive apparatus and a shift-by-wire system having the same.

BACKGROUND

In a known shift range change apparatus of a vehicle, an electronic control device senses a shift range selected by a driver of the vehicle and controls a drive operation of a rotational drive apparatus according to a sensed value of the shift range to change a shift range of an automatic transmission with a torque outputted from the rotational drive apparatus.

For example, in the shift-by-wire system of JP2010-203543A, the rotational drive apparatus is connected to the shift range change apparatus of the automatic transmission and changes the shift range of the automatic transmission with a torque outputted from an output portion of the rotational drive apparatus. The rotational drive apparatus has a rotatable member, which is made of resin and has external teeth meshed with external teeth of the output portion. A magnet is installed to this rotatable member, and a magnetic flux generated from the magnet is sensed to sense a rotational position of the rotatable member. Thereby, a rotational position of the output portion and the shift position of the shift range change apparatus are indirectly sensed. Therefore, there is a possibility of deteriorating a sensing accuracy of a rotational position of the output portion due to, for example, backlash between the output portion and the rotatable member.

In the shift-by-wire system of JP2010-203543A, the output portion is made of a magnetic material, such as iron, to implement a sufficient strength. If the magnet is installed to the output portion to directly sense the rotational position of the output portion, the magnetic flux, which is generated from the magnet, flows into the output portion to possibly cause a reduction of the density of the magnetic flux to be sensed. In such a case, the sensing accuracy of the rotational position of the output portion may possibly be deteriorated.

In another rotational drive apparatus disclosed in JP5648564B2, an electric rotating machine and a speed reducing device are installed in a space located in an inside of a housing, which includes a front housing and a rear housing, such that the electric rotating machine is installed at the front housing side in the space, and the speed reducing device is installed at the rear housing side in the space. A speed of rotation (torque), which is outputted from the electric rotating machine, is reduced through the speed reducing device (serving as a gear mechanism), and the rotation (torque) of the reduced rotational speed is outputted to a manual shaft of a shift range change apparatus through an output portion. It is assumed that the rotational drive apparatus is installed such that the rear housing opposes or contacts an outer wall of the shift range change apparatus. The speed reducing device projects from a center of the electric rotating machine toward the shift range change apparatus. Therefore, a dead space, which is in a generally ring form, may possibly be formed between a portion of the outer wall of the rear housing, which is located around the speed reducing device, and the outer wall of the shift range change apparatus. Thus, installability of the rotational drive apparatus may possibly be deteriorated.

Furthermore, in the rotational drive apparatus of JP5648564B2, in a case where a magnetic flux density sensing device, which is provided to sense a rotational position of the output portion, is placed at the front housing side, the magnetic flux density sensing device is located adjacent to the electric rotating machine. Therefore, the sensing accuracy of the rotational position of the output portion may possibly be deteriorated by a leakage flux, which is a magnetic flux leaked from the electric rotating machine. In contrast, in a case where the magnetic flux density sensing device is installed at the rear housing side, which is far from the electric rotating machine, the dead space is further increased to possibly causing further deterioration of the installability of the rotational drive apparatus.

SUMMARY

The present disclosure is made in view of the above points. According to the present disclosure, there is provided a rotational drive apparatus that includes a housing, an electric rotating machine, an output gear, an output portion, a yoke, a first magnetic flux generating portion, a second magnetic flux generating portion, a magnetic flux density sensing device and a primary hole. The electric rotating machine is installed in an inside of the housing. The output gear is made of a magnetic material and is rotated by a torque outputted from the electric rotating machine. The output portion is formed integrally with the output gear such that an axis of the output portion coincides with a rotational center of the output gear. The output portion is rotated integrally with the output gear. The yoke is placed at the output gear and includes a first yoke and a second yoke. An arcuate gap is formed between the first yoke and the second yoke and extends along an arc that is centered at the rotational center of the output gear. The first magnetic flux generating portion is placed between one end of the first yoke and one end of the second yoke. The second magnetic flux generating portion is placed between another end of the first yoke and another end of the second yoke. The magnetic flux density sensing device is installed to the housing in a manner that enables relative movement of the magnetic flux density sensing device in the arcuate gap relative to the yoke. The magnetic flux density sensing device outputs a signal that corresponds to a density of a magnetic flux, which passes through the magnetic flux density sensing device. The primary hole is formed between the rotational center of the output gear and the yoke such that the primary hole extends through the output gear in a plate thickness direction of the output gear.

According to the present disclosure, there is also provided a rotational drive apparatus that is installable to an installation subject and is operable to rotate a drive subject. The rotational drive apparatus includes a front housing, a rear housing, an electric rotating machine, a gear mechanism, an output portion and a magnetic flux density sensing device. The rear housing forms a space between the front housing and the rear housing. A surface of the rear housing, which is located on a side that is opposite from the front housing, is opposable to or contactable with the installation subject. The electric rotating machine is installed at the rear housing side in the space. The gear mechanism is installed in the space at a location, which is on a side of the electric rotating machine where the front housing is placed. The gear mechanism is operable to transmit a torque of the electric rotating machine. The output portion is placed on a radially outer side of the electric rotating machine and includes a connecting portion. The connecting portion is connectable to the drive subject and is located at a side of the output portion, at which the installation subject is placed, and the output portion outputs the torque, which is transmitted to the output portion through the gear mechanism, to the drive subject. The magnetic flux density sensing device is installed at the front housing side in a manner that enables relative rotation of the magnetic flux density sensing device relative to the output portion. The magnetic flux density sensing device outputs a signal, which corresponds to a density of a magnetic flux that passes through the magnetic flux density sensing device.

BRIEF DESCRIPTION OF THE DRAWINGS

The drawings described herein are for illustration purposes only and are not intended to limit the scope of the present disclosure in any way.

DETAILED DESCRIPTION

Hereinafter, a rotational drive apparatus of various embodiments of the present disclosure will be described with reference to the accompanying drawings. In the following embodiments, components, which are substantially identical to each other, will be indicated by the same reference signs and will not be redundantly described for the sake of simplicity.

(First Embodiment)

Figure 1:
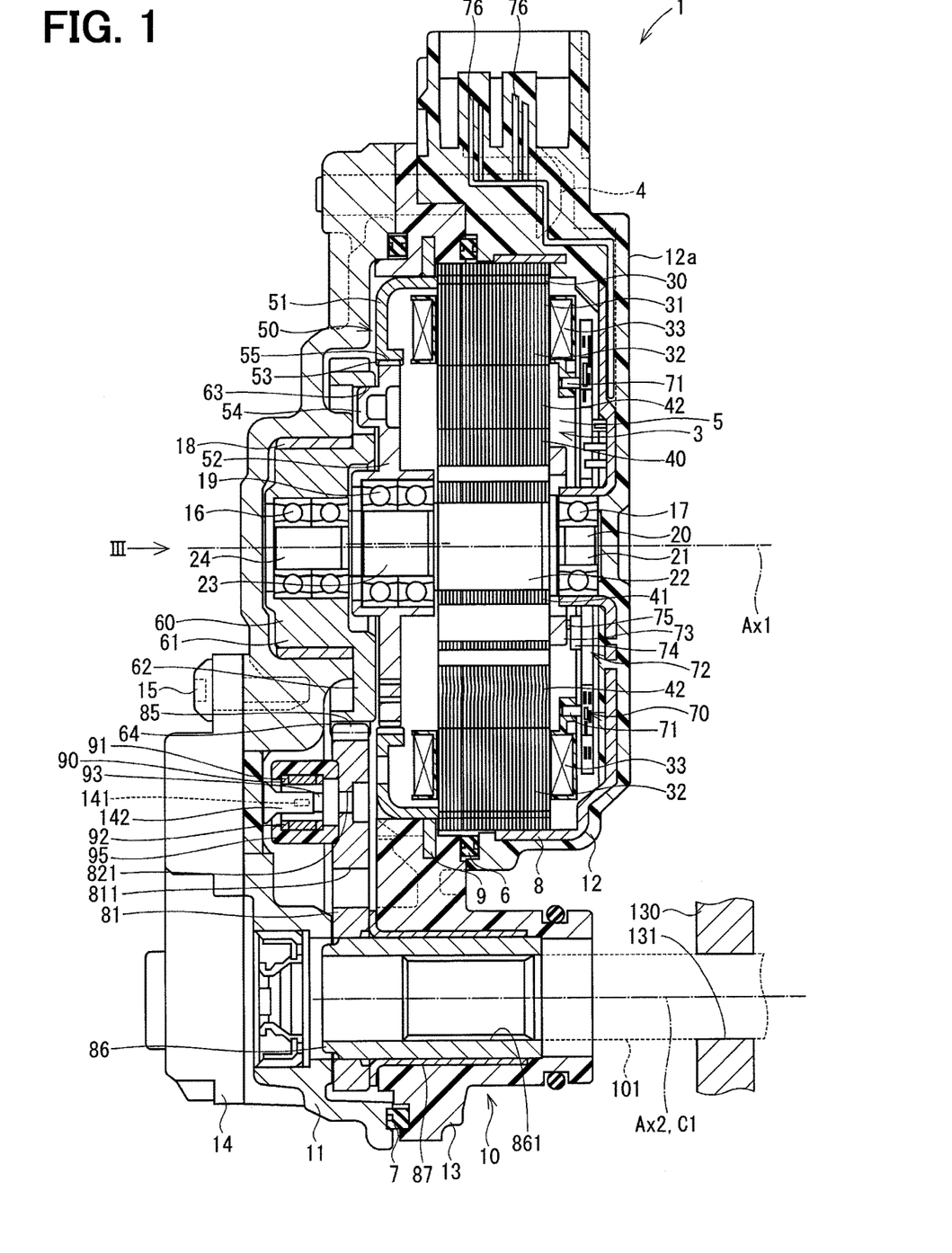
FIG. 1 is a cross sectional view of a rotational drive apparatus according to a first embodiment of the present disclosure.

A rotational actuator (serving as the rotational drive apparatus) 1 shown in FIG. 1 is applied as a drive apparatus of, for example, a shift-by-wire system that changes a shift of an automatic transmission of a vehicle.

Figure 2:
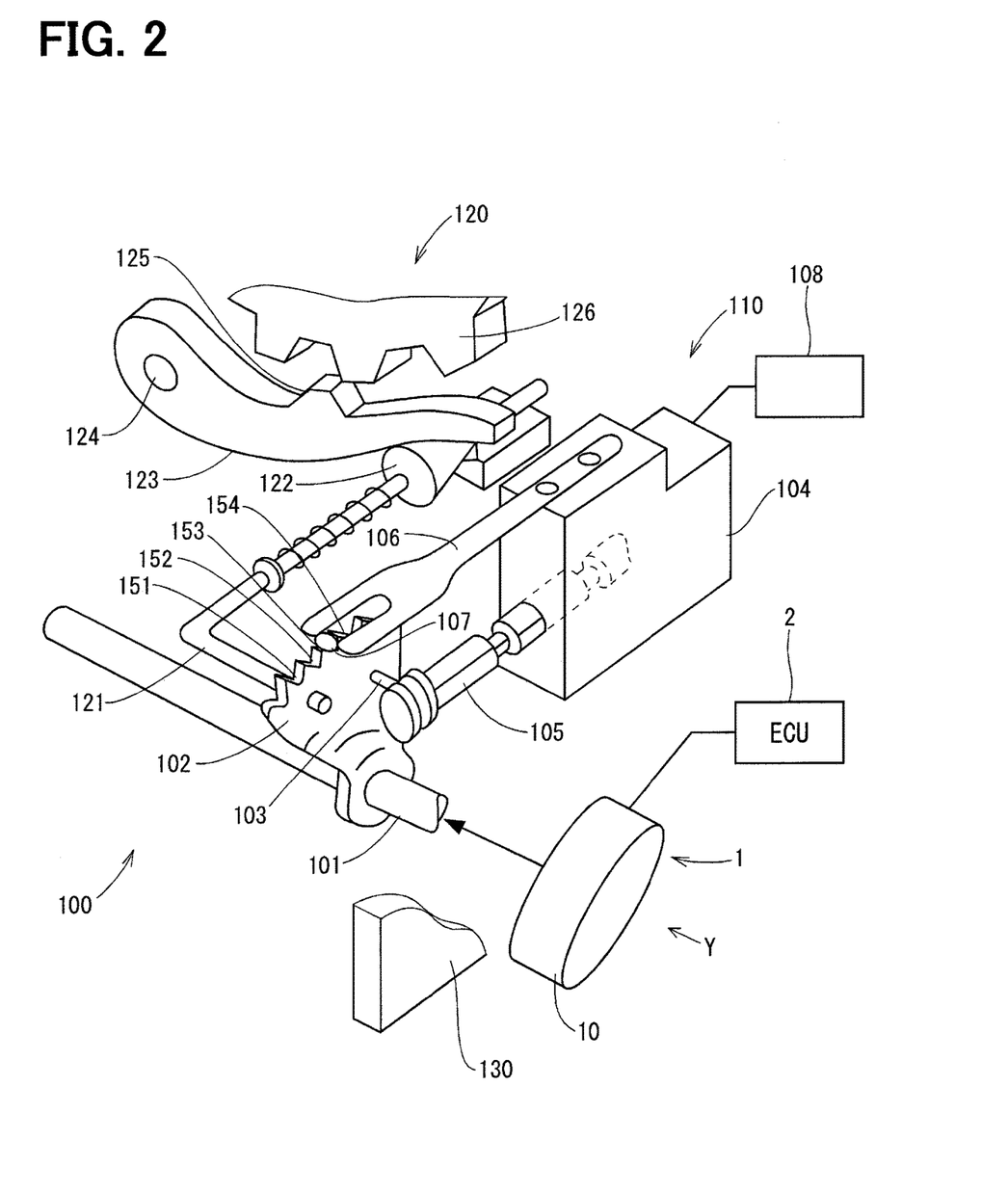
FIG. 2 is a schematic perspective view of a shift-by-wire system having the rotational drive apparatus according to the first embodiment.

First of all, the shift-by-wire system will be described. As shown in FIG. 2, the shift-by-wire system 100 includes the rotational actuator 1, an electronic control unit (ECU) 2, a shift range change apparatus 110 and a parking change apparatus 120. The rotational actuator 1 rotates a manual shaft 101 of the shift range change apparatus 110, which serves as a drive subject. Thereby, a shift range of the automatic transmission 108 is changed. The rotation of the rotational actuator 1 is controlled by the ECU 2. The rotational actuator 1 is installed to, for example, a wall portion (also referred to as a housing) 130 of the shift range change apparatus 110. The wall portion 130 serves as an installation subject, to which the rotational actuator 1 is installed. The rotational actuator 1 drives a park rod 121 of the parking change apparatus 120 by rotating the manual shaft 101 of the shift range change apparatus 110.

The shift range change apparatus 110 includes the manual shaft 101, a detent plate 102, an oil pressure valve body 104 and the wall portion 130. The wall portion 130 receives the manual shaft 101, the detent plate 102 and the oil pressure valve body 104. The manual shaft 101 is arranged such that one end portion of the manual shaft 101 projects from the wall portion 130 through a hole 131 (see FIG. 1), which is formed through the wall portion 130.

The one end portion of the manual shaft 101 is coupled to an output portion 86 of the rotational actuator 1 by a way of a spline coupling, which will be described later. The detent plate 102 is shaped into a fan-shape form that extends from the manual shaft 101 in a radially outer direction and is rotated integrally with the manual shaft 101. A pin 103, which projects in parallel with the manual shaft 101, is formed at the detent plate 102.

The pin 103 is engaged to an end portion of the manual spool valve 105 that is installed in the oil pressure valve body 104. Thereby, the manual spool valve 105 is reciprocated in an axial direction of the manual spool valve 105 by the detent plate 102, which is rotated integrally with the manual shaft 101. When the manual spool valve 105 is reciprocated in the axial direction, the manual spool valve 105 switches an oil pressure supply passage that supplies an oil pressure to an oil pressure clutch of the automatic transmission 108. Thus, an engaging state of the oil pressure clutch is changed, and a shift range of the automatic transmission 108 is changed.

The detent plate 102 has a recess 151, a recess 152, a recess 153, and a recess 154 at a radial end portion of the detent plate 102. These recesses 151-154 correspond to, for example, a P-range, an R-range, an N-range and a D-range, respectively, which are shift ranges of the automatic transmission 108. A stopper 107, which is supported at a distal end of a leaf spring 106, is fitted into one of the recesses 151-154 of the detent plate 102, so that an axial position of the manual spool valve 105 is set.

When a torque is applied from the rotational actuator 1 to the detent plate 102 through the manual shaft 101, the stopper 107 is moved to another one of the recesses 151-154, which is adjacent to the above-described one of the recesses 151-154. Thereby, the axial position of the manual spool valve 105 is changed.

For example, when the manual shaft 101 is rotated in a clockwise direction in a view taken in a direction of an arrow Y in FIG. 2, the pin 103 is rotated through the detent plate 102 to push the manual spool valve 105 into an inside of the oil pressure valve body 104, so that a corresponding oil passage is sequentially changed in an order of an oil passage for the D-range, an oil passage for the N-range, an oil passage for the R-range and an oil passage for the P-range. In this way, the shift range of the automatic transmission 108 is changed in the order of the D-range, the N-range, the R-range and the P-range.

In contrast, when the manual shaft 101 is rotated in a counterclockwise direction in the view taken in the direction of the arrow Y in FIG. 2, the pin 103 is rotated to pull the manual spool valve 105 from the inside of the oil pressure valve body 104, so that the corresponding oil passage is sequentially changed in an order of the oil passage for the P-range, the oil passage for the R-range, the oil passage for the N-range and the oil passage for the D-range. Thereby, the shift range of the automatic transmission 108 is changed in the order of the P-range, the R-range, the N-range and the D-range.

As discussed above, predetermined rotational angles of the manual shaft 101, which is rotated by the rotational actuator 1, i.e., predetermined positions of the manual shaft 101 in the rotational direction correspond to the shift ranges, respectively, of the automatic transmission 108.

The parking change apparatus 120 includes the park rod 121, a park pole 123 and a parking gear 126. The park rod 121 is shaped into a generally L-shape form. The detent plate 102 is connected to one end portion of the park rod 121. A conical portion 122 is formed at another end portion of the park rod 121. When the rotational motion of the detent plate 102 is converted into linear motion of the park rod 121, the conical portion 122 is reciprocated in an axial direction of the conical portion 122. The park pole 123 contacts an outer peripheral surface of the conical portion 122. Therefore, when the park rod 121 is reciprocated, the park pole 123 is rotated about a shaft portion 124.

A projection 125 projects from the park pole 123 in a rotational direction of the park pole 123. When the projection 125 is engaged with the parking gear 126, rotation of the parking gear 126 is limited. Thereby, drive wheels of the vehicle are locked through a drive shaft or a differential gear, which are not depicted in the drawings. In contrast, when the projection 125 of the park pole 123 is disengaged from the parking gear 126, the rotation of the parking gear 126 is enabled. Thereby, the locking of the drive wheels of the vehicle is released.

Next, the rotational actuator 1 will be described.

As shown in FIG. 1, the rotational actuator 1 includes a housing 10, an input shaft 20, an electric motor (serving as an electric rotating machine) 3, a speed reducing device (serving as a gear mechanism) 50, an output shaft 60, an output gear 81, an output portion 86, a yoke 90, a permanent magnet (serving as a first magnetic flux generating portion) 93, a permanent magnet (serving as a second magnetic flux generating portion) 94, a Hall IC (serving as a magnetic flux density sensing device) 141, primary holes (also referred to as first to third primary holes) 811, 812, 813 and secondary holes (also referred to as first to third secondary holes) 821, 822, 823.

The housing 10 includes a front housing 11, a rear housing 12, a middle housing 13 and a sensor housing 14. The rear housing 12, the middle housing 13 and the sensor housing 14 are made of, for example, resin. The front housing 11 is made of metal, such as aluminum.

The rear housing 12 is shaped into a tubular form having a bottom. The middle housing 13 is shaped into a ring form and contacts an opening portion of the rear housing 12. The front housing 11 contacts an opposite side of the middle housing 13, which is opposite from the rear housing 12. The sensor housing 14 contacts an opposite side of the front housing 11, which is opposite from the middle housing 13. In the present embodiment, the rotational actuator 1 is installed to the wall portion 130 such that a surface 12a of the rear housing 12, which is opposite from the front housing 11, is opposed to the wall portion 130 of the shift range change apparatus 110.

The rear housing 12 and the front housing 11 are fixed together with bolts 4 in a state where the middle housing 13 is clamped between the rear housing 12 and the front housing 11. Thereby, a space 5 is formed in the inside of the rear housing 12, the middle housing 13 and the front housing 11.

A gasket 6 is clamped between the rear housing 12 and the middle housing 13, and a gasket 7 is clamped between the middle housing 13 and the front housing 11. The gaskets 6, 7 are shaped into a ring form and are made of rubber. Thus, an inside of the space 5 is gas tightly or liquid tightly sealed from an outside of the space 5.

The sensor housing 14 is fixed to the front housing 11 with bolts 15.

The input shaft 20 is made of, for example, metal. The input shaft 20 includes one end portion 21, a large diameter portion 22, an eccentric portion 23 and another end portion (hereinafter referred to as the other end portion) 24. The one end portion 21, the large diameter portion 22, the eccentric portion 23, and the other end portion 24 are arranged one after another in this order in a direction of an axis Ax1 of the input shaft 20 and are formed integrally as a one-piece body.

The one end portion 21 is shaped into a cylindrical form. The large diameter portion 22 is shaped into a cylindrical form and has an outer diameter that is larger than an outer diameter of the one end portion 21. Furthermore, the large diameter portion 22 is coaxial with the one end portion 21 (i.e., a central axis of the large diameter portion 22 and a central axis of the one end portion 21 coincide with the axis Ax1). The eccentric portion 23 is shaped into a cylindrical form and has an outer diameter that is smaller than the outer diameter of the large diameter portion 22. The eccentric portion 23 is eccentric to the axis Ax1, which is the rotational center of the input shaft 20. That is, the eccentric portion 23 is eccentric to the one end portion 21 and the large diameter portion 22. The other end portion 24 is shaped into a cylindrical form and has an outer diameter that is smaller than the outer diameter of the eccentric portion 23. The other end portion 24 is coaxial with the one end portion 21 and the large diameter portion 22 (i.e., a central axis of the other end portion 24 and the central axis of the large diameter portion 22 coincide with the axis Ax1).

The input shaft 20 is rotatably supported such that the other end portion 24 is rotatably supported by a front bearing 16, and the one end portion 21 is rotatably supported by a rear bearing 17. In the present embodiment, each of the front bearing 16 and the rear bearing 17 is, for example, a ball bearing.

The front bearing 16 is installed in an inside of the output shaft 60, which will be described later. The output shaft 60 is rotatably supported by a metal bearing 18, which is installed in an inside of the front housing 11. The metal bearing 18 is shaped into a tubular form and is made of metal. Specifically, the other end portion 24 of the input shaft 20 is rotatably supported through the metal bearing 18 (the metal bearing 18 being installed in the inside of the front housing 11), the output shaft 60 and the front bearing 16. The one end portion 21 of the input shaft 20 is rotatably supported through the rear bearing 17, which is installed to a center part of a bottom portion of the rear housing 12. As discussed above, the input shaft 20 is rotatably supported by the housing 10.

The motor 3, which serves as the electric rotating machine, is a three-phase brushless motor that generates a drive force without using a permanent magnet. The motor 3 is installed at the rear housing 12 side in the space 5. More specifically, the motor 3 is installed in the space 5 at a location that is adjacent to the rear housing 12. That is, the motor 3 is received in the inside of the housing 10. The motor 3 includes a stator 30, coils 33 and a rotor 40.

The stator 30 is shaped into a generally circular ring form. The stator 30 is press fitted into a plate 8, which is made of metal and is insert molded into the rear housing 12, so that the stator 30 is non-rotatably fixed to the rear housing 12.

The stator 30 includes a plurality of thin plates, which are made of, for example, a magnetic material (e.g., iron) and are stacked one after another in a plate thickness direction of the respective thin plates. The stator 30 includes a stator core 31 and a plurality of stator teeth 32. The stator core 31 is shaped into a circular ring form. The stator teeth 32 radially inwardly project from the stator core 31. The stator teeth 32 are arranged one after another at equal intervals in a circumferential direction. In the present embodiment, the number of the stator teeth 32 is, for example, twelve.

The coils 33 are wound around corresponding ones of the teeth 32. The coils 33 are electrically connected to a bus bar portion 70. The bus bar portion 70 is installed to the bottom portion of the rear housing 12, as shown in FIG. 1. An electric current to be supplied to the coils 33 is conducted through the bus bar portion 70. The bus bar portion 70 includes terminals 71, which are placed on a radially inner side of the coils 33 installed to the stator 30 and are connected to the coils 33. The coils 33 are electrically connected to the terminals 71. The electric power is supplied to the terminals 71 based on a drive signal, which is outputted from the ECU 2.

The rotor 40 is placed on a radially inner side of the stator 30. The rotor 40 includes a plurality of thin plates, which are made of, for example, a magnetic material (e.g., iron) and are stacked one after another in a plate thickness direction of the respective thin plates. The rotor 40 includes a rotor core 41 and a plurality of salient pole 42. The rotor core 41 is shaped into a circular ring form and is securely press fitted to the large diameter portion 22 of the input shaft 20. The salient poles 42 radially outwardly project from the rotor core 41 toward the stator 30. The salient poles 42 are arranged one after another at equal intervals in the circumferential direction. In the present embodiment, the number of the salient pole 42 is, for example, eight. Since the rotor core 41 is securely press fitted to the input shaft 20, the rotor 40 is rotatable relative to the housing 10 and the stator 30.

When the electric power is supplied to the coils 33, a magnetic force is generated at the stator teeth 32, around which the coils 33 are wound. Thereby, the corresponding salient poles 42 of the rotor 40 are magnetically attracted to the corresponding stator teeth 32. The coils 33 form three phases, i.e., a U-phase, a V-phase and a W-phase (i.e., the coils 33 include a U-phase coil, a V-phase coil and a W-phase coil). When the ECU 2 sequentially changes the energization of the coils 33 in an order of the U-phase, the V-phase and the W-phase, the rotor 40 is rotated in one rotational direction. In contrast, when the ECU 2 changes the energization of the coils 33 in an order of the W-phase, the V-phase and the U-phase, the rotor 40 is rotated in another rotational direction, which is opposite from the one rotational direction. When the magnetic force, which is generated in the stator teeth 32, is controlled by sequentially changing the energization of the coils 33 in this manner, the rotor 40 can be rotated in any of the one rotational direction and the other rotational direction.

In the present embodiment, a rotary encoder 72 is installed between the bottom portion of the rear housing 12 and the rotor core 41. The rotary encoder 72 includes a magnet 73, a circuit board 74 and a Hall IC 75.

The magnet 73 is shaped into a ring form and is formed as a multi-pole magnet that has a plurality of N-poles and a plurality of S-poles, which are alternately arranged one after another in a circumferential direction. The magnet 73 is installed to an end portion of the rotor core 41, which is located on the rear housing 12 side, in such a manner that the magnet 73 is coaxial with the rotor core 41. The circuit board 74 is fixed to an inner wall of the bottom portion of the rear housing 12. The Hall IC 75 is installed to the circuit board 74 such that the Hall IC 75 is opposed to the magnet 73.

The Hall IC 75 includes a Hall element and a signal converter circuit. The Hall element is a magneto-electric transducer that uses a Hall effect and outputs an electric signal that is proportional to a density of a magnetic flux generated from the magnet 73. The signal converter circuit converts the output signal of the Hall element into a digital signal. The Hall IC 75 outputs a pulse signal, which is synchronized with the rotation of the rotor core 41, to the ECU 2 through a signal pin 76. The ECU 2 can sense a rotational angle and a rotational direction of the rotor core 41 based on the pulse signal outputted from the Hall IC 75.

The speed reducing device 50 includes a ring gear 51 and a sun gear 52.

The ring gear 51 is shaped into a circular ring form and is made of metal, such as iron. The ring gear 51 is press fitted to a plate 9, which is shaped into a ring form and is insert molded into the middle housing 13, so that the ring gear 51 is non-rotatably fixed to the housing 10. Here, the ring gear 51 is fixed to the housing 10 in such a manner that the ring gear 51 is coaxial with the input shaft 20 (i.e., coaxial with the axis Ax1 of the input shaft 20). The ring gear 51 includes a plurality of internal teeth 53, which are formed one after another along an inner peripheral edge of the ring gear 51.

The sun gear 52 is shaped into a generally circular disk form and is made of metal, such as iron. The sun gear 52 includes a plurality of projections 54, each of which is shaped into a cylindrical form and axially projects from a surface of the sun gear 52 at a corresponding location that is spaced from a center of the sun gear 52 by a predetermined distance in a radial direction. The projections 54 are arranged one after another at equal intervals in the circumferential direction of the sun gear 52. In the present embodiment, the number of the projections 54 is, for example, nine (see FIG. 3). The sun gear 52 include a plurality of external teeth 55, which are formed one after another along an outer peripheral edge portion of the sun gear 52 such that the external teeth 55 are meshed with the internal teeth 53 of the ring gear 51. The sun gear 52 is eccentric to the input shaft 20 and is rotatably supported through a middle bearing 19 that is installed to an outer peripheral surface of the eccentric portion 23 of the input shaft 20, so that the sun gear 52 is rotatable relative to the input shaft 20. In this way, when the input shaft 20 is rotated, the sun gear 52 is rotated and is revolved on a radially inner side of the ring gear 51 while the external teeth 55 of the sun gear 52 are meshed with the internal teeth 53 of the ring gear 51. Similar to the front bearing 16 and the rear bearing 17, the middle bearing 19 is, for example, a ball bearing.

The output shaft 60 is made of metal, such as iron. The output shaft 60 includes an output tubular portion 61, which is shaped into a generally cylindrical tubular form, and a circular disk portion 62, which is shaped into a generally circular disk form. The output tubular portion 61 is rotatably supported by the housing 10 through the metal bearing 18 that is installed to the inside of the front housing 11. The output tubular portion 61 is coaxial with the large diameter portion 22 of the input shaft 20. The front bearing 16 is installed to the inside of the output tubular portion 61. In this way, the output tubular portion 61 rotatably supports the other end portion 24 of the input shaft 20 through the metal bearing 18 and the front bearing 16.

The circular disk portion 62 is shaped into a generally circular disk form that radially outwardly extends from an end portion of the output tubular portion 61, which is located on the sun gear 52 side, in the space 5. The circular disk portion 62 includes a plurality of holes 63, into each of which a corresponding one of the projections 54 of the sun gear 52 is inserted. The holes 63 extend through the circular disk portion 62 in a plate thickness direction of the circular disk portion 62. In the present embodiment, the holes 63 are formed one after another in the circumferential direction of the circular disk portion 62 to correspond with the projections 54, respectively, and the number of the holes 63 is nine (see FIG. 3).

Figure 3:
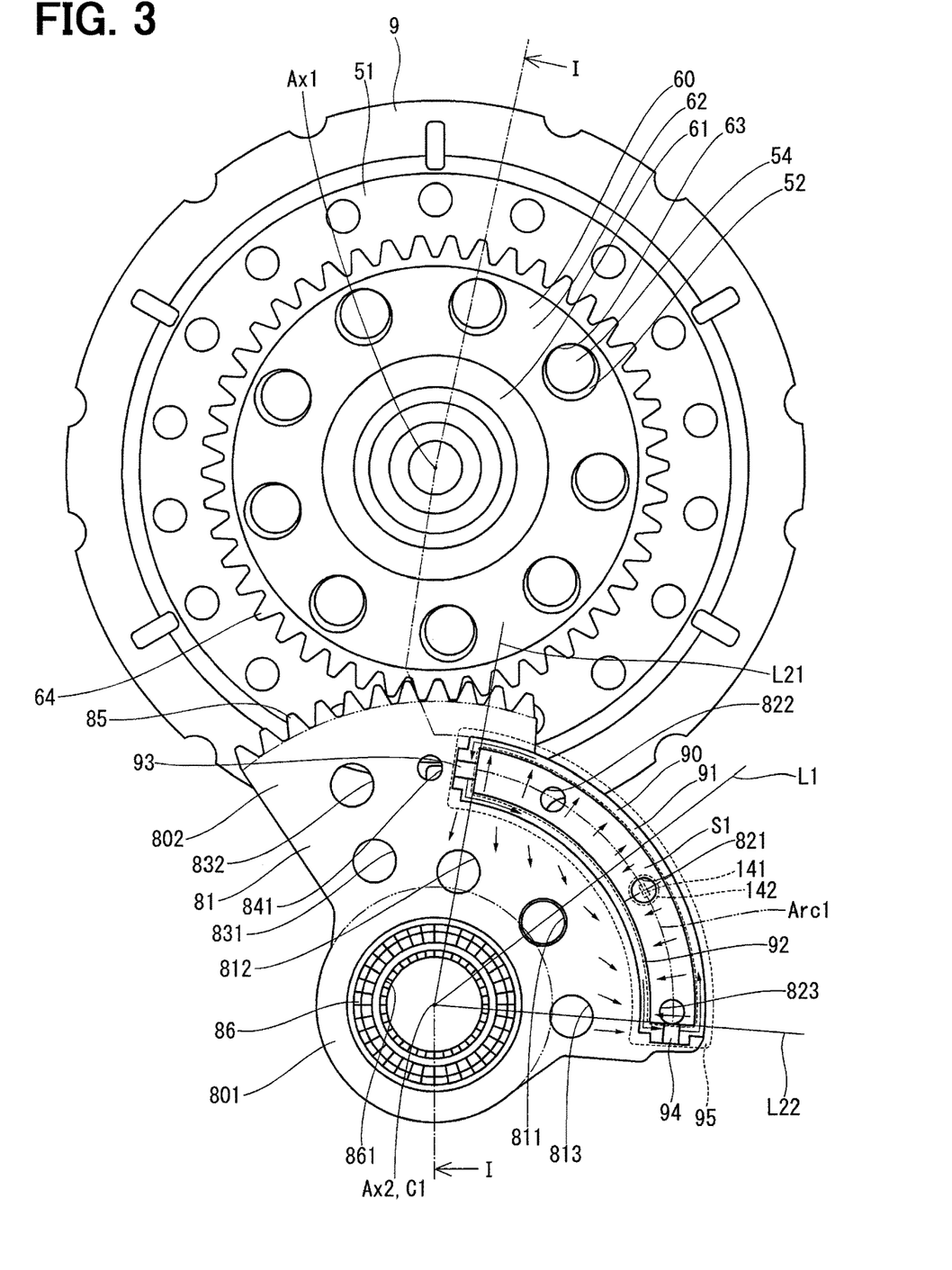
FIG. 3 is a view taken in a direction of an arrow III in FIG. 1, showing a portion of the rotational drive apparatus according to the first embodiment.

A plurality of external teeth 64 is formed one after another along an entire circumferential extent of an outer peripheral edge part of the circular disk portion 62 (see FIG. 3).

With the above described construction, when the sun gear 52 is rotated and is revolved on the radially inner side of the ring gear 51, an inner peripheral wall of each of the holes 63 of the circular disk portion 62 of the output shaft 60 is pushed by an outer peripheral wall of the corresponding one of the projections 54 in the circumferential direction of the circular disk portion 62. In this way, a rotational force component of the sun gear 52 is transmitted to the output shaft 60. A rotational speed of the sun gear 52 is lower than a rotational speed of the input shaft 20. Therefore, the rotational output of the motor 3 is outputted from the output shaft 60 after a rotational speed of the rotation outputted from the motor 3 is reduced. As described above, the ring gear 51 and the sun gear 52 function as a speed reducing device.

The output gear 81 is made of a magnetic material, such as iron, which has a relatively high strength. The output gear 81 is formed into a plate form. As shown in FIG. 3, the output gear 81 includes a ring portion (more specifically, a circular ring portion) 801, a fan-shaped portion 802, and a plurality of external teeth 85.

The ring portion 801 is shaped into a circular ring form. The fan-shaped portion 802 radially outwardly extends in a form of a fan shape from an outer peripheral edge part of the ring portion 801. In FIG. 3, a boundary between the ring portion 801 and the fan-shaped portion 802 is indicated by a dot-dot-dash line.

The external teeth 85 are formed in a fraction of an outer peripheral edge part of the fan-shaped portion 802. The output gear 81 is placed between the middle housing 13 and the sensor housing 14 such that the external teeth 85 are meshed with the external teeth 64 of the output shaft 60. In this way, when the output shaft 60 is rotated upon rotation of the motor 3, the output gear 81 is rotated about the axis of the ring portion 801. That is, the output gear 81 is rotated by the torque outputted from the motor 3. Here, the axis (central axis) of the ring portion 801 is a rotational center C1 of the output gear 81.

The output portion 86 is shaped into a generally cylindrical tubular form and is made of metal, such as iron, which has a relatively high strength. An outer peripheral wall of one end part of the output portion 86 is fitted into an inner peripheral wall of the ring portion 801 of the output gear 81. The output portion 86 is formed such that the output portion 86 is not rotatable relative to the output gear 81 at the rotational center C1. That is, the output portion 86 is formed integrally with the output gear 81 such that an axis Ax2 of the output portion 86 coincides with the rotational center C1 of the output gear 81. Therefore, when the output gear 81 is rotated, the output portion 86 is rotated together with the output gear 81 about the rotational center C1.

An opposite end side of the output portion 86, which is opposite from the output gear 81, is placed in an inside of a metal bearing 87, which is shaped into a tubular form and is installed to the middle housing 13. Thereby, the output portion 86 and the output gear 81 are rotatably supported by the middle housing 13 through the metal bearing 87.

A plurality of spline grooves 861, which serve as a connecting portion, is formed in an inner peripheral wall of the opposite end part of the output portion 86, which is opposite from the output gear 81.

As shown in FIG. 1, one end part of the manual shaft 101 of the shift-by-wire system 100 is fitted to the spline grooves 861 of the output portion 86, so that the output portion 86 and the manual shaft 101 are connected together through the spline coupling. In this way, the output portion 86 outputs the torque of the motor 3 to the manual shaft 101 when the rotation of the input shaft 20 is transmitted to the output portion 86 through the speed reducing device 50 and the output gear 81.

As shown in FIG. 2, the yoke 90 includes a first yoke (also referred to as a first yoke element) 91 and a second yoke (also referred to as a second yoke element) 92. Each of the first yoke 91 and the second yoke 92 is shaped into an arcuate form and is formed by stacking a plurality of arcuate thin plates made of a magnetic material, such as iron. The first yoke 91 and the second yoke 92 are placed on the sensor housing 14 side of the output gear 81. The first yoke 91 is placed along an untoothed outer peripheral edge part of the fan-shaped portion 802 of the output gear 81, at which the external teeth 85 are not present. The second yoke 92 is placed on a radially inner side of the first yoke 91, at which the rotational center C1 of the output gear 81 is placed, such that the second yoke 92 is placed at a location that is spaced from the first yoke 91 by a predetermined distance.

The first yoke 91 and the second yoke 92 respectively extend along an arc (imaginary arc) Arc1 that is centered at the rotational center C1 of the output gear 81. Thereby, an arcuate gap S1 is formed between the first yoke 91 and the second yoke 92. The arcuate gap S1 is a gap that arcuately extends along the arc Arc1, which is centered at the rotational center C1.

The magnet 93, which serves as the first magnetic flux generating portion, is clamped between one end of the first yoke 91 and one end of the second yoke 92. An S-pole side of the magnet 93 contacts the one end of the first yoke 91, and an N-pole side of the magnet 93 contacts the one end of the second yoke 92.

The magnet 94, which serves as the second magnetic flux generating portion, is clamped between the other end of the first yoke 91 and the other end of the second yoke 92. An N-pole side of the magnet 94 contacts the other end of the first yoke 91, and an S-pole side of the magnet 94 contacts the other end of the second yoke 92.

In this way, the magnetic flux, which is generated from the respective N-poles of the magnets 93, 94, flows through the first yoke 91 and the second yoke 92. Furthermore, a portion of the magnetic flux, which flows in the first yoke 91 and the second yoke 92, passes through the arcuate gap S1 between the first yoke 91 and the second yoke 92 as a leakage flux. Also, another portion of the magnetic flux, which is generated from the N-poles of the magnets 93, 94, flows into the output gear 81 made of the magnetic material.

In the present embodiment, the first yoke 91, the second yoke 92 and the magnets 93, 94 are covered with a molded portion 95 made of the resin. That is, the first yoke 91, the second yoke 92 and the magnets 93, 94 are resin molded.

The Hall IC 141, which serves as the magnetic flux density sensing device, is insert molded into a support portion 142 that is formed to project from the sensor housing 14 toward the output gear 81. That is, the Hall IC 141 is installed at the front housing 11 side. The support portion 142 supports the Hall IC 141. As shown in FIGS. 1 and 3, the support portion 142 and the Hall IC 141 are placed in the arcuate gap S1. That is, the Hall IC 141 is installed to the sensor housing 14 in a manner that enables relative movement of the Hall IC 141 in the arcuate gap S1 relative to the yoke 90.

Similar to the Hall IC 75, the Hall IC 141 includes a Hall element and a signal converter circuit. The Hall element outputs a signal that corresponds to a density of the leakage flux that passes through the arcuate gap S1. That is, the Hall element outputs the signal that corresponds to the density of the magnetic flux, which passes through the Hall element.

The output gear 81 and the output portion 86 are rotatable within a circumferential extent of the external teeth 85. That is, a rotatable range of the output gear 81 and the output portion 86 corresponds to a circumferential extent of the external teeth 85. The Hall IC 141 and the support portion 142 are movable (displaceable) relative to the yoke 90 from one location, which is adjacent to the magnet 93 side end of the arcuate gap S1, to another location, which is adjacent to the magnet 94 side end of the arcuate gap S1.

The Hall IC 141 outputs a signal, which corresponds to a rotational position of the yoke 90, to the ECU 2. The ECU 2 can sense a rotational position of the output gear 81 and the output portion 86 based on the signal outputted from the Hall IC 141. In this way, the ECU 2 can sense a rotational position of the manual shaft 101 and the shift range of the automatic transmission 108.

As shown in FIG. 3, the primary hole (the first primary hole) 811 is formed between the rotational center C1 and the yoke 90 such that the primary hole 811 extends through the fan-shaped portion 802 of the output gear 81 in the plate thickness direction of the output gear 81. Here, the plate thickness direction of the output gear 81 is defined as a direction that is perpendicular to a plane of the output gear 81 (more specifically, a plane of the fan-shaped portion 802). The primary hole 811 is shaped into a circular form. Here, the primary hole 811 is formed such that a center of the primary hole 811 is placed along a primary imaginary straight line L1 that connects between the rotational center C1 and a center (circumferential center) of the yoke 90. The primary hole 811 is formed along an outer peripheral edge of the ring portion 801.

In the present embodiment, the primary imaginary straight line L1 extends through a center (circumferential center) of the arcuate gap S1.

The primary hole (the second primary hole) 812 is formed between the rotational center C1 and the yoke 90 such that the primary hole 812 extends through the fan-shaped portion 802 of the output gear 81 in the plate thickness direction of the output gear 81. Similar to the primary hole 811, the primary hole 812 is formed into the circular form. Here, the primary hole 812 is formed such that a center of the primary hole 812 is placed along a secondary imaginary straight line (first secondary imaginary line) L21 that connects between the rotational center C1 and one end of the yoke 90 (more specifically, one circumferential end of the arcuate gap S1), i.e., the location adjacent to the magnet 93. The primary hole 812 is formed along the outer peripheral edge of the ring portion 801.

The primary hole (the third primary hole) 813 is formed between the rotational center C1 and the yoke 90 such that the primary hole 813 extends through the fan-shaped portion 802 of the output gear 81 in the plate thickness direction of the output gear 81. Similar to the primary hole 812, the primary hole 813 is formed into the circular form. Here, the primary hole 813 is formed such that a center of the primary hole 813 is placed along a secondary imaginary straight line (second secondary imaginary line) L22 that connects between the rotational center C1 and the other end of the yoke 90 (more specifically, the other circumferential end of the arcuate gap S1), i.e., the location adjacent to the magnet 94. The primary hole 813 is formed along the outer peripheral edge of the ring portion 801.

In the present embodiment, the primary holes 811, 812, 813 are arranged one after another at equal intervals in the circumferential direction of the output gear 81.

The secondary hole (the first secondary hole) 821 is formed at a location that corresponds to the arcuate gap S1 (i.e., a location that is opposed to the arcuate gap S1 in a direction parallel to the axis Ax2 of the output portion 86) such that the secondary hole 821 extends through the fan-shaped portion 802 of the output gear 81 in the plate thickness direction of the output gear 81. The secondary hole 821 is shaped into a circular form. The secondary hole 821 is formed on the magnet 94 side of the primary imaginary straight line L1.

The secondary hole (the second secondary hole) 822 is formed at a location that corresponds to the arcuate gap S1 (i.e., a location that is opposed to the arcuate gap S1 in a direction parallel to the axis Ax2 of the output portion 86) such that the secondary hole 822 extends through the fan-shaped portion 802 of the output gear 81 in the plate thickness direction of the output gear 81. Similar to the secondary hole 821, the secondary hole 822 is shaped into a circular form. The secondary hole 822 is formed at an intermediate location that is between the primary imaginary straight line L1 and the secondary imaginary straight line L21.

The secondary hole 823 is formed at a location that corresponds to the arcuate gap S1 (i.e., a location that is opposed to the arcuate gap S1 in a direction parallel to the axis Ax2 of the output portion 86) such that the secondary hole 823 extends through the fan-shaped portion 802 of the output gear 81 in the plate thickness direction of the output gear 81. Similar to the secondary hole 822, the secondary hole 823 is shaped into a circular form. The secondary hole 823 is formed at a location that is adjacent to the secondary imaginary straight line L22.

Holes 831, 832, 841 are also formed in the output gear 81 besides the primary holes 811, 812, 813 and the secondary holes 821, 822, 823.

These holes 831, 832, 841 are formed to extend through the fan-shaped portion 802 of the output gear 81 in the plate thickness direction of the output gear 81. Similar to the primary hole 811, the holes 831, 832 are shaped into a circular form. The holes 831, 832 are formed between the ring portion 801 and the external teeth 85. Similar to the secondary hole 821, the hole 841 is shaped into a circular form. The hole 841 is formed at a location, which is adjacent to the magnet 93 and is between the ring portion 801 and the external teeth 85.

FIG. 3 shows the magnetic flux, which is generated from the N-poles of the magnets 93, 94 and flows through the yoke 90 and the output gear 81, as well as the leakage flux, which radially passes through the arcuate gap S1 in the radial direction of the output gear 81. In FIG. 3, a direction of the respective arrows corresponds to a flow direction of the magnetic flux, and a length of the respective arrows corresponds to a degree of a magnetic flux density (also simply referred to as a flux density).

As shown in FIG. 3, the density (flux density) of the leakage flux, which radially passes through the arcuate gap S1 in the radial direction of the output gear 81, is increased toward the magnet 93 or the magnet 94 and is reduced toward the primary imaginary straight line L1. Furthermore, the direction of the leakage flux, which radially passes through the arcuate gap S1 on one side of the primary imaginary straight line L1, and the direction of the leakage flux, which radially passes through the arcuate gap S1 on the other side of the primary imaginary straight line L1, are opposite to each other, i.e., are reversed relative to each other. Therefore, the magnetic flux density becomes zero at a location of the arcuate gap S1, which corresponds to the primary imaginary straight line L1. Furthermore, since the primary holes 811, 812, 813 are formed in the output gear 81, the path of the magnetic flux, which flows in the output gear 81, is restricted.

As described above, (1) the rotational actuator 1 of the present embodiment includes the housing 10, the motor 3, the output gear 81, the output portion 86, the yoke 90, the magnet 93, the magnet 94, the Hall IC 141 and the primary holes 811, 812, 813.

The motor 3 is placed in the inside of the housing 10.

The output gear 81 is made of the magnetic material and is rotated by the torque outputted from the motor 3.

The output portion 86 is integrated with the output gear 81 such that the axis Ax2 of the output portion 86 coincides with the rotational center C1 of the output gear 81, and the output portion 86 is rotated integrally with the output gear 81.

The yoke 90 is placed at the output gear 81 and includes the first yoke 91 and the second yoke 92. The arcuate gap S1, which extends along the arc Arc1 that is centered at the rotational center C1 of the output gear 81, is formed between the first yoke 91 and the second yoke 92.

The magnet 93 is installed between the one end of the first yoke 91 and the one end of the second yoke 92.

The magnet 94 is installed between the other end of the first yoke 91 and the other end of the second yoke 92.

The Hall IC 141 is installed to the housing 10 such that the Hall IC 141 is movable in the arcuate gap S1 relative to the yoke 90, and the Hall IC 141 outputs the signal that corresponds to the density of the magnetic flux, which passes through the Hall IC 141.

The primary holes 811, 812, 813 are formed between the rotational center C1 of the output gear 81 and the yoke 90 such that the primary holes 811, 812, 813 extend through the output gear 81 in the plate thickness direction of the output gear 81.

In the present embodiment, the magnetic flux, which is generated from the magnet 93 and the magnet 94, flows through the first yoke 91 and the second yoke 92, and a portion of the magnetic flux becomes the leakage flux and passes through the arcuate gap S1 between the first yoke 91 and the second yoke 92. The Hall IC 141 outputs the signal that corresponds to the density of the leakage flux that passes through the arcuate gap S1. In this way, the position of the Hall IC 141 relative to the yoke 90 can be sensed, and thereby the rotational position of the output portion 86 can be sensed.

The magnetic flux, which is generated from the magnet 93 and the magnet 94, also flows in the output gear 81 that is made of the magnetic material. In the present embodiment, the primary holes 811, 812, 813 are formed between the rotational center C1 of the output gear 81 and the yoke 90, i.e., are formed at the specific locations of the output gear 81. Therefore, the path of the magnetic flux, which flows in the output gear 81, can be restricted. In this way, the magnetic flux, which flows in the output gear 81, can be reduced. Thereby, the density of the leakage flux, which passes through the arcuate gap S1 in the radial direction of the output gear 81, can be increased. Thus, the sensing accuracy of the rotational position of the output portion 86 can be improved.

In a comparative case where the yoke 90, the magnet 93 and the magnet 94 are installed to a separate rotatable member that is formed separately from the output portion 86, the sensing accuracy of the rotational position of the output portion 86 may possibly be deteriorated due to, for example, backlash between the output portion 86 and the rotatable member. In the present embodiment, the yoke 90, the magnet 93 and the magnet 94 are installed to the output gear 81 that is formed integrally with the output portion 86, through which the torque of the rotational actuator 1 is outputted. Therefore, the rotational position of the output portion 86 can be accurately sensed.

Furthermore, the output gear 81, to which the yoke 90 is installed, is made of the magnetic material, which has the relatively high strength. Thus, the output gear 81 is suitable for use in the middle of the transmission path of the drive force, which is located on the upstream side of the output portion 86 that outputs the torque of the rotational actuator 1.

Furthermore, (2) according to the present embodiment, the primary hole 811 is formed along the primary imaginary straight line L1, which connects between the rotational center C1 and the center (circumferential center) of the yoke 90. The magnetic flux density becomes zero at the location of the arcuate gap S1, which corresponds to the primary imaginary straight line L1. Thus, it is possible to restrict the path of the magnetic flux by the primary hole 811, which is located along the primary imaginary straight line L1, in the corresponding portion of the output gear 81, which corresponds to the location of the arcuate gap S1 where the magnetic flux density becomes zero. Thereby, the magnetic flux density can be increased at the adjacent region, which is adjacent to the location of the arcuate gap S1 where the magnetic flux density becomes zero. Thus, if the primary hole 811 is not formed in the output gear 81, the density of the leakage flux is decreased at the adjacent region, which is adjacent to the above-described location of the arcuate gap S1 where the magnetic flux density becomes zero. However, in the present embodiment, the magnetic flux density can be increased at the adjacent region, which is adjacent to the location of the arcuate gap S1 where the magnetic flux density becomes zero. Thereby, particularly, it is possible to improve the sensing accuracy of the rotational position of the output portion 86 at the center of the rotatable range of the output gear 81 and the output portion 86. As a result, the sensing accuracy of the rotational position of the output portion 86 can be improved throughout the entire rotatable range of the output gear 81 and the output portion 86.

Furthermore, (3) according to the present embodiment, the primary hole 812 is formed along the secondary imaginary straight line L21, which connects between the rotational center C1 and the one end of the yoke 90. Furthermore, the primary hole 813 is formed along the secondary imaginary straight line L22, which connects between the rotational center C1 and the other end of the yoke 90. Thus, the magnetic flux density can be increased at the magnet 93 side end part of the arcuate gap S1 and the magnet 94 side end part of the arcuate gap S1. Thereby, particularly, the sensing accuracy of the rotational position of the output portion 86 can be improved at both of the end parts of the rotatable range of the output gear 81 and the output portion 86.

Furthermore, (4) in the present embodiment, the multiple primary holes (811, 812, 813) are formed one after another in the circumferential direction of the output gear 81. Therefore, the magnetic flux density can be uniformly increased along the arcuate gap S1 in the longitudinal direction of the arcuate gap S1. Furthermore, according to the present embodiment, the number of the primary holes (811, 812, 813) is three, and these three primary holes (811, 812, 813) are arranged one after another at equal intervals in the circumferential direction of the output gear 81.

Furthermore, (5) in the present embodiment, the output gear 81 further includes the secondary holes 821, 822, 823, each of which is formed at the location that corresponds to the arcuate gap S1 such that the secondary hole 821, 822, 823 extend through the output gear 81 in the plate thickness direction of the output gear 81. Thus, it is possible to reduce the magnetic flux, which flows in the portion of the output gear 81 that corresponds to the arcuate gap S1. Thereby, the density of the leakage flux, which radially passes through the arcuate gap S1 in the radial direction of the output gear 81, can be increased. As a result, the sensing accuracy of the rotational position of the output portion 86 can be improved.

Furthermore, (6) in the present embodiment, there is provided the rotational actuator 1, which is installable to the wall portion (serving as the installation subject) 130 and is operable to rotate the manual shaft 101 of the shift range change apparatus 110. The rotational actuator 1 includes the front housing 11, the rear housing 12, the motor 3, the speed reducing device 50, the output portion 86 and the Hall IC 141.

The rear housing 12 forms the space 5 between the front housing 11 and the rear housing 12. The surface 12a of the rear housing 12, which is located on the side that is opposite from the front housing 11, is opposable to the wall portion 130.

The motor 3 is installed at the rear housing 12 side in the space 5. More specifically, the motor 3 is installed in the space 5 at the location that is adjacent to the rear housing 12.

The speed reducing device (serving as the gear mechanism) 50 is installed in the space 5 at the location that is on the side of the motor 3 where the front housing 11 is placed. The speed reducing device 50 is operable to transmit the torque of the motor 3.

The output portion 86 is placed on the radially outer side of the motor 3 and includes the spline grooves (serving as the connecting portion) 861. The spline grooves 861 are connectable to the manual shaft 101 of the shift range change apparatus 110 and is located at the side of the output portion 86, at which the wall portion 130 is placed, and the output portion 86 outputs the torque, which is transmitted to the output portion 86 through the speed reducing device 50, to the manual shaft 101 of the shift range change apparatus 110.

The Hall IC 141 is installed at the front housing 11 side in a manner that enables relative rotation of the Hall IC 141 relative to the output portion 86 (more specifically a manner that enables rotation of the output gear 81 relative to the Hall IC 141 at the time of rotating the output gear 81). The Hall IC 141 outputs the signal, which corresponds to the density of the magnetic flux that passes through the Hall IC 141.

In the present embodiment, the speed reducing device 50 is placed on the side of the motor 3 where the front housing 11 is placed. Thus, the rear housing 12 (more specifically the bottom wall of the rear housing 12 that has the surface 12a), which is placed on the opposite side of the motor 3 that is opposite form the speed reducing device 50, can be shaped into a planar form. Thereby, at the time of installing the rotational actuator 1 to the wall portion 130, a dead space, which would be formed between the rear housing 12 and the wall portion 130, can be reduced. Therefore, the installability of the rotational actuator 1 can be improved.

Furthermore, in the present embodiment, the Hall IC 141 is placed at the front housing 11 side. Specifically, the Hall IC 141 can be placed on the side of the speed reducing device 50, which is opposite from the motor 3. Therefore, the distance between the Hall IC 141 and the motor 3 can be increased. In this way, an influence of a leakage flux, which is a magnetic flux leaked from the motor 3, on the Hall IC 141 can be limited. Thus, the sensing accuracy of the rotational position of the output portion 86 with the Hall IC 141 can be improved.

Furthermore, in the present embodiment, since the Hall IC 141 is placed at the front housing 11 side, it is possible to further limit the dead space, which would be formed between the rear housing 12 and the wall portion 130, in comparison to the case where the Hall IC 141 is placed at the rear housing 12 side.

Furthermore, (7) according to the present embodiment, the rotational actuator 1 includes the output gear 81 that is located on the side of the motor 3, which is opposite from the rear housing 12 of the motor 3. The output gear 81 is rotatable integrally with the output portion 86 and is rotated by the torque, which is transmitted to the output gear 81 through the speed reducing device 50. The Hall IC 141 is placed on the side of the output gear 81, which is opposite from the motor 3. Therefore, a distance between the Hall IC 141 and the motor 3 can be increased, and the leakage flux, which is leaked from the motor 3, can be blocked by the output gear 81. Thereby, the influence of the leakage flux, which is leaked from the motor 3, on the Hall IC 141 can be further limited.

Furthermore, (11) the shift-by-wire system 100 of the present embodiment includes the rotational actuator 1 and the shift range change apparatus 110 described above. The shift range change apparatus 110 is connected to the output portion 86 of the rotational actuator 1 and can change the shift range of the automatic transmission 108 by the torque outputted from the output portion 86.

The rotational actuator 1 of the present embodiment has the high sensing accuracy for sensing the rotational position of the output portion 86. Therefore, the rotational position of the manual shaft 101, which is connected to the output portion 86, can be more accurately sensed, and thereby the shift range of the automatic transmission 108 can be more accurately sensed.

(Second Embodiment)

Figure 4:
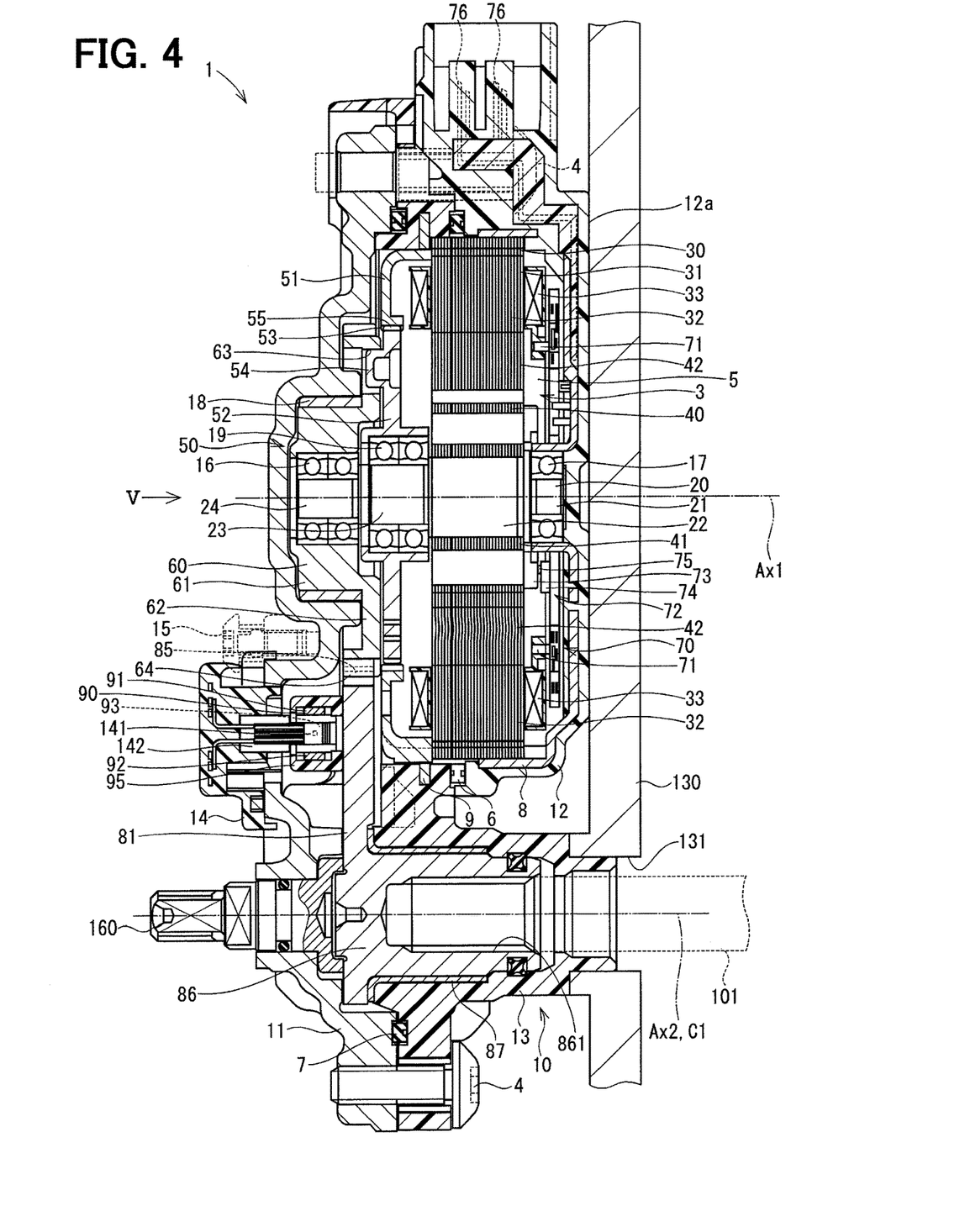
FIG. 4 is a cross sectional view of a rotational drive apparatus according to a second embodiment of the present disclosure.
Figure 5:
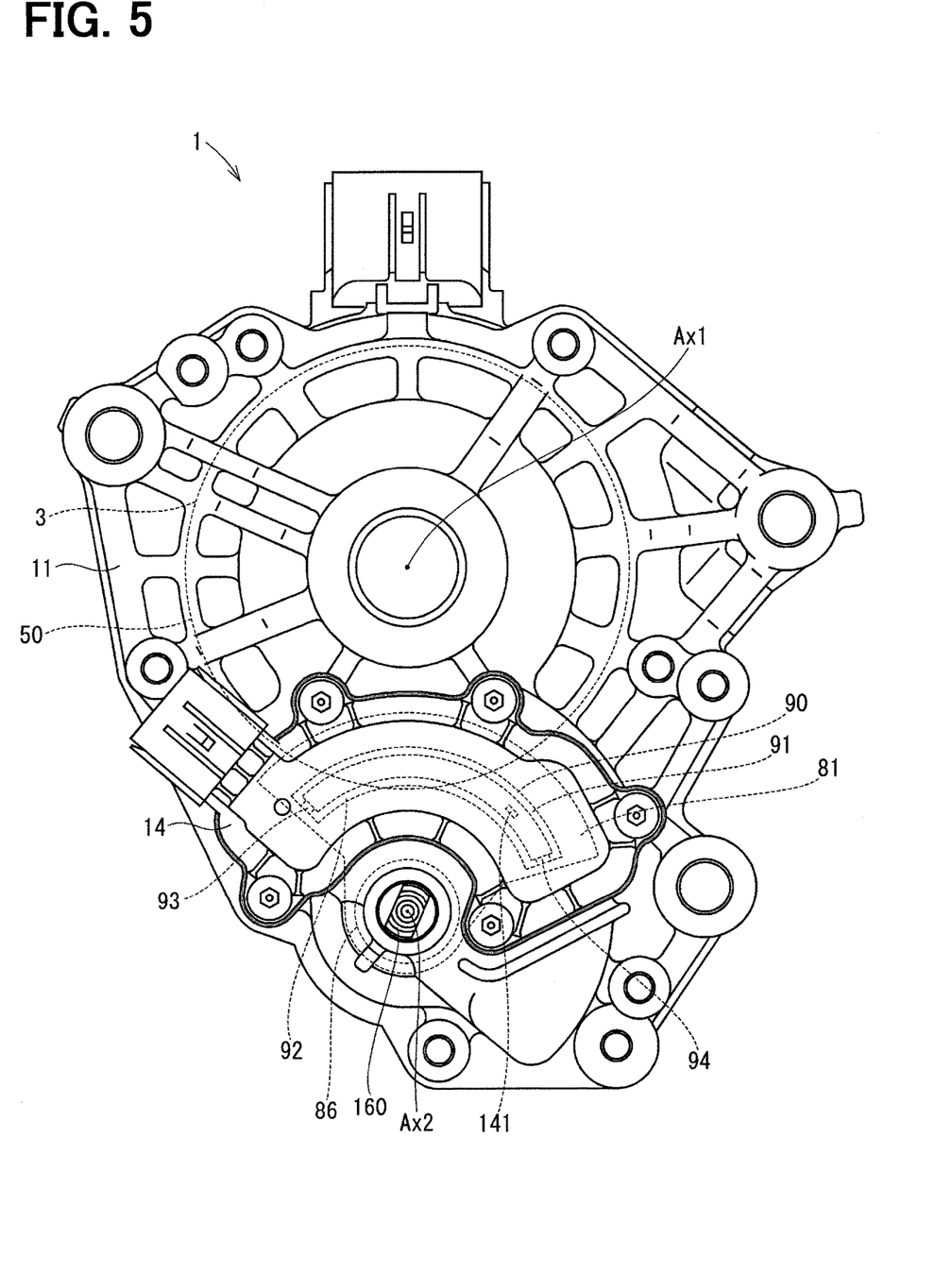
FIG. 5 is a view taken in a direction of an arrow V in FIG. 4.

FIGS. 4 and 5 show the rotational actuator 1 according to a second embodiment of the present disclosure.

The rotational actuator 1 of the present embodiment further includes a forceful drive shaft 160.

The forceful drive shaft 160 is elongated in a cylindrical form and is made of metal. The forceful drive shaft 160 is located along the axis Ax2 of the output portion 86 at a location that is on a side of the output portion 86, which is opposite from the spline grooves 861. In the present embodiment, the forceful drive shaft 160 is coaxial with the output portion 86.

When a torque is inputted to the forceful drive shaft 160, the forceful drive shaft 160 forcefully rotates the output portion 86. In the present embodiment, when the output portion 86 is forcefully rotated by the forceful drive shaft 160, the manual shaft 101 is rotated in a direction for releasing the engagement between the projection 125 of the park pole 123 and the parking gear 126, i.e., a direction for moving the stopper 107 from the recess 151 (the P-range) to the recess 154 (the D-range).

For example, even in a case where the rotational actuator 1 is malfunctioning and is thereby not operable in the state where the shift range is the P-range, it is possible to release the P-range (release the lock of the drive wheels) by manually rotating the forceful drive shaft 160.

In the present embodiment, the rotational actuator 1 is installed to the wall portion 130 such that the surface 12a of the rear housing 12, which is located on the side that is opposite from the front housing 11, contacts the wall portion 130 of the shift range change apparatus 110 (see FIG. 4).

As shown in FIG. 5, according to the present embodiment, the yoke 90 is placed between the speed reducing device 50 and the forceful drive shaft 160.

In the present embodiment, the output gear 81 and the output portion 86 are integrally formed as a one-piece body from a common member. Furthermore, in the present embodiment, the primary hole 811 and the secondary hole 821 are not formed in the output gear 81.

The rest of the rotational actuator 1 of the second embodiment, which is other than the above-described structure, is the same as that of the first embodiment. Therefore, the structure of the rotational actuator 1 of the second embodiment, which is other than the above-described structure, can provide advantages, which are similar to those of the first embodiment.

As described above, (9) in the present embodiment, the rotational actuator 1 includes the forceful drive shaft 160. Also, as discussed above, the forceful drive shaft 160 is located along the axis Ax2 of the output portion 86 at the location that is on the side of the output portion 86, which is opposite from the spline grooves 861. When the torque is inputted to the forceful drive shaft 160, the forceful drive shaft 160 forcefully rotates the output portion 86. Thereby, even in the case where the rotational actuator 1 is malfunctioning and is thereby not operable in the state where the shift range is the P-range, it is possible to release the P-range (release the lock of the drive wheels) by manually rotating the forceful drive shaft 160.

Furthermore, (10) the rotational actuator 1 of the second embodiment includes the output gear 81 and the yoke 90. The Hall IC 141 is displaceable in the arcuate gap S1, which is formed between the first yoke 91 and the second yoke 92, relative to the yoke 90. The yoke 90 is placed between the speed reducing device 50 and the forceful drive shaft 160. As discussed above, in the present embodiment, the yoke 90 is placed in the space, which is located between the speed reducing device 50 and the forceful drive shaft 160 and is formed due to the provision of the forceful drive shaft 160, so that this space can be effectively used.

(Third Embodiment)

Figure 6:
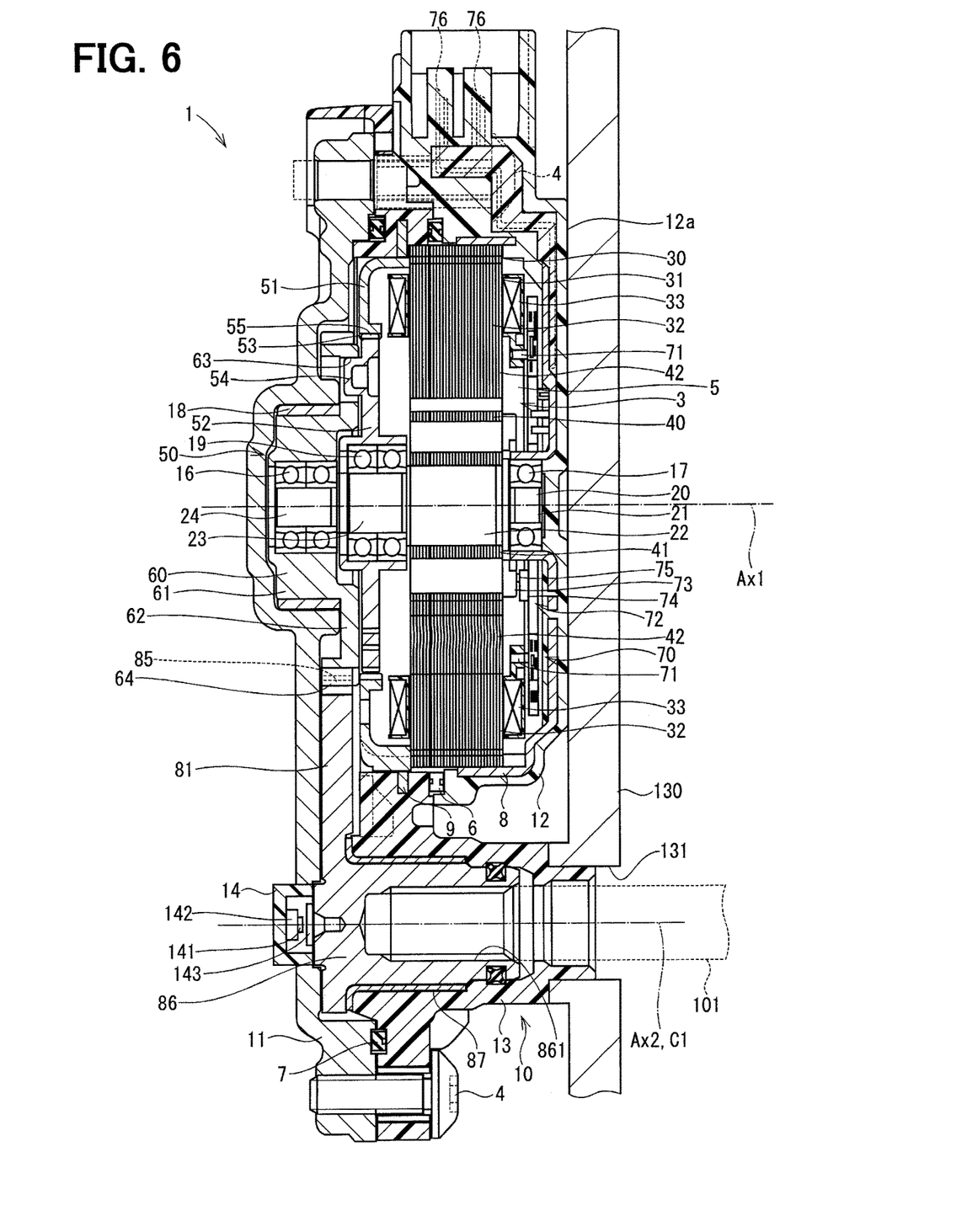
FIG. 6 is a cross sectional view of a rotational drive apparatus according to a third embodiment of the present disclosure.

FIG. 6 shows the rotational actuator 1 according to a third embodiment of the present disclosure. The third embodiment differs from the second embodiment with respect to the location of the Hall IC 141 and other points discussed below.

In the third embodiment, the rotational actuator 1 does not include the yoke 90 and the forceful drive shaft 160 discussed in the second embodiment. Furthermore, the Hall IC 141 is located along the axis Ax2 of the output portion 86.

More specifically, the Hall IC 141 is supported by the support portion 142, which is located in the inside of the sensor housing 14 and is located along the axis Ax2 of the output portion 86.

A magnet 143 is installed to an end part of the output portion 86, which is opposite from the spline grooves 861. Therefore, the magnet 143 can rotate integrally with the output portion 86. The magnet 143 is opposed to the Hall IC 141 along the axis Ax2 of the output portion 86.

The Hall IC 141 outputs a signal, which corresponds to a density of a magnetic flux generated by the magnet 143. In this way, the relative rotational position of the magnet 143 relative to the Hall IC 141 can be sensed, and thereby the rotational position of the output portion 86 can be sensed.

Even in the third embodiment, the Hall IC 141 is placed on the side of the output gear 81, which is opposite from the motor 3. Therefore, the distance between the Hall IC 141 and the motor 3 can be increased, and the leakage flux, which is leaked from the motor 3, can be blocked by the output gear 81. Furthermore, in the third embodiment, the Hall IC 141 is located along the axis Ax2 of the output portion 86, so that the distance between the Hall IC 141 and the motor 3 is larger than that of the second embodiment.

The rest of the rotational actuator 1 of the third embodiment, which is other than the above-described structure, is the same as that of the second embodiment. Therefore, the structure of the rotational actuator 1 of the third embodiment, which is other than the above-described structure, can provide advantages, which are similar to those of the second embodiment.

As discussed above, (8) in the present embodiment, the Hall IC 141 is located along the axis Ax2 of the output portion 86. Therefore, the distance between the Hall IC 141 and the motor 3 can be further increased, and thereby the influence of the leakage flux, which is leaked from the motor 3, on the Hall IC 141 can be further limited. Furthermore, since the yoke 90 can be eliminated according to the third embodiment, a reduction in the number of the components, a reduction in the size and simplification of the magnetic circuit can be achieved. Furthermore, in the case where the Hall IC 141 is spaced away from the axis Ax2 of the output portion 86 like in the case of the second embodiment, when the output shaft 60 and the output gear 81 are tilted, the distance between the yoke 90 and the Hall IC 141 is changed to possibly deteriorate the sensing accuracy of the Hall IC 141. In contrast, since the Hall IC 141 is located along the axis Ax2 of the output portion 86, even when the output portion 86 is tilted, a change in the distance between the magnet 143 and the Hall IC 141 is minimized. Thereby, it is possible to limit the deterioration of the sensing accuracy of the Hall IC 141.

(Other Embodiments)

In the first embodiment, the three primary holes (811, 812, 813) are arranged one after another at the equal intervals in the circumferential direction of the output gear. In another embodiment of the present disclosure, the primary holes may not be arranged one after another at the equal intervals in the circumferential direction of the output gear. In other words, the primary holes may be arranged one after another at any intervals in the circumferential direction of the output gear. Furthermore, the number of the primary hole(s) in the output gear may be changed to one, two, four or more. That is, the number of the primary hole(s) may be any suitable number. Furthermore, each of the primary holes may not be formed to have its center along the corresponding one of the primary imaginary straight line L1 and the secondary imaginary straight lines L21, L22.

Furthermore, in another embodiment of the present disclosure, the shape of each of the primary and secondary holes should not be limited to the circular form and may be changed to any suitable shape, such an ellipse form, a triangular form, a rectangular form or any other polygonal form.

Furthermore, in another embodiment of the present disclosure, the number of the secondary hole(s) in the output gear should not be limited to three and may be changed to one, two, four or more. That is, the number of the primary hole(s) may be any suitable number.

Furthermore, in another embodiment of the present disclosure, the secondary holes may not be formed in the output gear 81 and may be formed in another member.

Furthermore, in another embodiment of the present disclosure, at least one of the holes 831, 832, 841 may not be formed in the output gear 81 and may be formed in another member.

In the above embodiments, there is described the exemplary case where the speed reducing device (serving as the gear mechanism), which reduces the speed of the rotation received from the input shaft and transmits the rotation of the reduced speed to the output shaft, is provided. In another embodiment of the present disclosure, in place of the speed reducing device, there may be provided a speed increasing device, which increases the speed of the rotation received from the input shaft and transmits the rotation of the increased speed to the output shaft. Furthermore, in place of the speed reducing device, there may be provided a mechanism that transmits the rotation received from the input shaft without changing the rotational speed. Alternatively, the input shaft and the output shaft may be integrally coupled or integrally formed to limit relative rotation therebetween without providing the mechanism, such as the speed reducing device or the speed increasing device. That is, it is only required that the output shaft can output the torque of the electric rotating machine to the shaft of the drive subject through the transmission of the rotation of the input shaft.

Furthermore, in the above embodiments, there is exemplified the case where the rotational actuator is installed to the housing of the shift range change apparatus. In contrast, in another embodiment of the present disclosure, the rotational actuator may be installed to another location, which is other than the housing of the shift range change apparatus, or an outer wall of another device.

In another embodiment of the present disclosure, the electric rotating machine should not be limited to the three-phase brushless motor and may be another type of motor.

In another embodiment of the present disclosure, the number of the recesses of the detent plate may be any suitable number. That is, the number of the ranges of the automatic transmission, to which the present disclosure is applicable, should not be limited to four.

Besides the automatic transmission of, for example, a continuously variable transmission (CVT) or an automatic transmission of a hybrid vehicle (HV), which changes the shift position among the four positions, i.e., the P-range, the R-range, the N-range and the D-range in a manner similar to the above embodiment, the shift-by-wire system of the present disclosure may be used for, for example, the range changing of the parking mechanism of an electric vehicle (EV) or the HV, which changes between two positions, i.e., the P-range and notP-range (non P-range, i.e., non-parking range).

In another embodiment of the present disclosure, another apparatus, which is other than the shift range change apparatus or the parking change apparatus of the shift-by-wire system of the vehicle, may be used as the drive subject or the installation subject.

As described above, the present disclosure should not be limited to the above embodiments and may be modified in various ways within the scope of the present disclosure.

What is claimed is:

1. A rotational drive apparatus comprising:
a housing;
an electric rotating machine that is installed in an inside of the housing;
an output gear that is made of a magnetic material and is rotated by a torque outputted from the electric rotating machine;
an output portion that is formed integrally with the output gear such that an axis of the output portion coincides with a rotational center of the output gear, wherein the output portion is rotated integrally with the output gear;
a yoke that is placed at the output gear and includes a first yoke and a second yoke, wherein an arcuate gap is formed between the first yoke and the second yoke and extends along an arc that is centered at the rotational center of the output gear;
a first magnetic flux generating portion that is placed between one end of the first yoke and one end of the second yoke;
a second magnetic flux generating portion that is placed between another end of the first yoke and another end of the second yoke;
a magnetic flux density sensing device that is installed to the housing in a manner that enables relative movement of the magnetic flux density sensing device in the arcuate gap relative to the yoke, wherein the magnetic flux density sensing device outputs a signal that corresponds to a density of a magnetic flux, which passes through the magnetic flux density sensing device; and
a primary hole that is formed between the rotational center of the output gear and the yoke such that the primary hole extends through the output gear in a plate thickness direction of the output gear.

2. The rotational drive apparatus according to claim 1, wherein the primary hole is placed along a primary imaginary straight line that connects between the rotational center of the output gear and a center of the yoke.

3. The rotational drive apparatus according to claim 1, wherein the primary hole is placed along a secondary imaginary straight line that connects between the rotational center of the output gear and one end or another end of the yoke.

4. The rotational drive apparatus according to claim 1, wherein the primary hole is one of a plurality of primary holes of the output gear, which are arranged one after another in a circumferential direction of the output gear.

5. The rotational drive apparatus according to claim 1, further comprising a secondary hole that is formed at a location, which corresponds to the arcuate gap, such that the secondary hole extends through the output gear in the plate thickness direction of the output gear.

6. A shift-by-wire system comprising:
the rotational drive apparatus of claim 1; and
a shift range change apparatus that is connected to the output portion of the rotational drive apparatus and is operable to change a shift range of an automatic transmission with the torque outputted from the output portion.

7. A rotational drive apparatus that is installable to an installation subject and is operable to rotate a drive subject, the rotational drive apparatus comprising:
- a front housing;
- a rear housing that forms a space between the front housing and the rear housing, wherein a surface of the rear housing, which is located on a side that is opposite from the front housing, is opposable to or contactable with the installation subject;
- an electric rotating machine that is installed at the rear housing side in the space;
- a gear mechanism that is installed in the space at a location, which is on one axial side of the electric rotating machine where the front housing is placed, wherein the gear mechanism is operable to transmit a torque of the electric rotating machine;
- an output portion that is placed on a radially outer side of the electric rotating machine and includes a connecting portion, wherein the connecting portion is configured to couple with the drive subject, which is located on another axial side of the electric rotating machine that is axially opposite from the one axial side of the electric rotating machine, to drive the drive subject when the torque of the electric rotating machine is transmitted to the output portion through the gear mechanism; and
- a magnetic flux density sensing device that is installed at the front housing side in a manner that enables relative rotation of the magnetic flux density sensing device relative to the output portion, wherein the magnetic flux density sensing device outputs a signal, which corresponds to a density of a magnetic flux that passes through the magnetic flux density sensing device.

8. The rotational drive apparatus according to claim 7, further comprising an output gear that is located on the one axial side of the electric rotating machine, which is axially opposite from the rear housing, wherein:
- the output gear is rotatable integrally with the output portion and is rotated by the torque, which is transmitted to the output gear through the gear mechanism; and
- the magnetic flux density sensing device is placed on a side of the output gear, which is axially opposite from the electric rotating machine.

9. The rotational drive apparatus according to claim 7, wherein the magnetic flux density sensing device is placed along an axis of the output portion.

10. The rotational drive apparatus according to claim 7, further comprising a forceful drive shaft, wherein the forceful drive shaft is located along an axis of the output portion at a location that is on a side of the output portion, which is opposite from the connecting portion, wherein when a torque is inputted to the forceful drive shaft, the forceful drive shaft forcefully rotates the output portion.

11. The rotational drive apparatus according to claim 10, further comprising:
- an output gear that is located on the side of the electric rotating machine, which is opposite from the rear housing, wherein the output gear is rotatable integrally with the output portion and is rotated by the torque, which is transmitted to the output gear through the gear mechanism; and
- a yoke that is placed at the output gear and includes a first yoke and a second yoke, wherein an arcuate gap is formed between the first yoke and the second yoke and extends along an arc that is centered at the rotational center of the output gear, wherein:
- the magnetic flux density sensing device is movable relative to the yoke in the arcuate gap; and
- the yoke is placed between the gear mechanism and the forceful drive shaft.

12. A shift-by-wire system comprising:
- the rotational drive apparatus of claim 7; and
- a shift range change apparatus that is connected to the output portion of the rotational drive apparatus and is operable to change a shift range of an automatic transmission with the torque outputted from the output portion.

\* \* \* \* \*